(12) United States Patent
Stern et al.

(10) Patent No.: US 8,433,660 B2
(45) Date of Patent: Apr. 30, 2013

(54) MANAGING A PORTFOLIO OF EXPERTS

(75) Inventors: David Stern, Cambridge (GB); Horst Cornelius Samulowitz, Cambridge (GB); Ralf Herbrich, Cambridge (GB); Thore Graepel, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/628,421

(22) Filed: Dec. 1, 2009

(65) Prior Publication Data

US 2011/0131163 A1 Jun. 2, 2011

(51) Int. Cl.
| | |
|---|---|
| G06F 15/18 | (2006.01) |
| G06F 17/00 | (2006.01) |
| G06F 5/00 | (2006.01) |
| G06F 15/00 | (2006.01) |
| G06E 1/00 | (2006.01) |
| G06E 3/00 | (2006.01) |
| G06G 7/00 | (2006.01) |

(52) U.S. Cl.
USPC .................... 706/12; 706/19; 706/45; 706/62

(58) Field of Classification Search .......................... None
See application file for complete search history.

(56) References Cited

U.S. PATENT DOCUMENTS

| | | | |
|---|---|---|---|
| 5,704,017 A | 12/1997 | Heckerman et al. | |
| 5,790,935 A | 8/1998 | Payton | |
| 6,029,161 A | 2/2000 | Lang et al. | |
| 6,041,311 A | 3/2000 | Chislenko et al. | |
| 6,049,777 A | 4/2000 | Sheena et al. | |
| 6,064,980 A | 5/2000 | Jacobi et al. | |
| 6,321,170 B1 | 11/2001 | Wurgler et al. | |
| 6,321,179 B1 | 11/2001 | Glance et al. | |
| 6,412,012 B1 | 6/2002 | Bieganski et al. | |
| 6,633,852 B1 | 10/2003 | Heckerman et al. | |
| 6,850,252 B1 | 2/2005 | Hoffberg | |
| 6,865,546 B1 | 3/2005 | Song | |
| 6,868,525 B1 | 3/2005 | Szabo | |
| 6,920,458 B1 * | 7/2005 | Chu et al. ........................ 707/600 |
| 7,050,868 B1 | 5/2006 | Graepel et al. | |
| 7,310,626 B2 | 12/2007 | Scarborough et al. | |

(Continued)

OTHER PUBLICATIONS

Bennett, et al., "The Netflix Prize", In Proceedings of KDD Cup and Workshop, 2007, 4 pages.

(Continued)

*Primary Examiner* — Kakali Chaki
*Assistant Examiner* — Daniel Pellett
(74) *Attorney, Agent, or Firm* — Zete Law, P.L.L.C.; MacLane C. Key

(57) ABSTRACT

Managing a portfolio of experts is described where the experts may be for example, automated experts or human experts. In an embodiment a selection engine selects an expert from a portfolio of experts and assigns the expert to a specified task. For example, the selection engine has a Bayesian machine learning system which is iteratively updated each time an experts performance on a task is observed. For example, sparsely active binary task and expert feature vectors are input to the selection engine which maps those feature vectors to a multi-dimensional trait space using a mapping learnt by the machine learning system. In examples, an inner product of the mapped vectors gives an estimate of a probability distribution over expert performance. In an embodiment the experts are automated problem solvers and the task is a hard combinatorial problem such as a constraint satisfaction problem or combinatorial auction.

20 Claims, 12 Drawing Sheets

U.S. PATENT DOCUMENTS

| | | |
|---|---|---|
| 7,359,550 B2 | 4/2008 | Brand |
| 7,376,474 B2 | 5/2008 | Graepel et al. |
| 7,389,201 B2 | 6/2008 | Chickering et al. |
| 7,480,640 B1 | 1/2009 | Elad et al. |
| 7,574,422 B2 | 8/2009 | Guan et al. |
| 7,584,171 B2 | 9/2009 | Guan et al. |
| 7,590,616 B2 | 9/2009 | Guan et al. |
| 7,596,538 B1 | 9/2009 | Owen et al. |
| 7,647,289 B2 | 1/2010 | Graepel et al. |
| 7,840,986 B2 | 11/2010 | Ali et al. |
| 7,953,676 B2 | 5/2011 | Agarwal et al. |
| 8,180,658 B2 * | 5/2012 | Hamadi et al. ............... 705/7.11 |
| 2002/0174429 A1 | 11/2002 | Gutta et al. |
| 2002/0199186 A1 | 12/2002 | Ali et al. |
| 2003/0234812 A1 | 12/2003 | Drucker et al. |
| 2004/0054572 A1 | 3/2004 | Oldale et al. |
| 2004/0083195 A1 | 4/2004 | McCord et al. |
| 2004/0103058 A1 | 5/2004 | Hamilton |
| 2004/0133526 A1 * | 7/2004 | Shmueli et al. ................. 705/80 |
| 2005/0193002 A1 | 9/2005 | Souders et al. |
| 2007/0005311 A1 * | 1/2007 | Wegerich et al. ................. 703/2 |
| 2007/0078849 A1 | 4/2007 | Slothouber |
| 2007/0150428 A1 | 6/2007 | Webb |
| 2007/0288413 A1 | 12/2007 | Mizuno et al. |
| 2008/0097821 A1 | 4/2008 | Chickering et al. |
| 2008/0120288 A1 | 5/2008 | Guan et al. |
| 2008/0126303 A1 | 5/2008 | Park et al. |
| 2008/0177726 A1 | 7/2008 | Forbes et al. |
| 2008/0183538 A1 * | 7/2008 | Hamadi et al. .................... 705/8 |
| 2008/0215411 A1 | 9/2008 | Hu et al. |
| 2009/0204234 A1 | 8/2009 | Sustaeta et al. |
| 2010/0030578 A1 | 2/2010 | Siddique et al. |
| 2010/0223212 A1 * | 9/2010 | Manolescu et al. ............. 706/12 |
| 2011/0061076 A1 | 3/2011 | Ali et al. |

OTHER PUBLICATIONS

Boley, et al., "Collaborative Filtering and Inference Rules for Context-Aware Learning Object Recommendation", retrieved on Aug. 22, 2008 at <<http://iit-iti.nrc-cnrc.gc.ca/iit-publications-iti/docs/NRC-48535.pdf>>, Troubador Publishing, 2005, pp. 179-188.

Breese, Heckerman, Kadie, "Empirical Analysis of Predictive Algorithms for Collaborative Filtering", retrieved on Oct. 13, 2009 at <<http://research.microsoft.com/pubs/69656/tr-98-12.pdf>>, Microsoft Research/Microsoft Corporation, Technical Report MSR-TR-98-12, May 1998, pp. 1-20.

Chen, "Context-Aware Collaborative Filtering System: Predicting the User's Preference in the Ubiquitous Computing Environment", retrieved on Aug. 22, 2008 at <<http://www.ibao.net/papers/cacf-loca05.pdf>>, Springer-Verlag Berlin Heidelberg, 2005, pp. 244-253.

Chu, Ghahramani, "Gaussian Processes for Ordinal Regression", retrieved on Oct. 13, 2009 at <<http://learning.eng.cam.ac.uk/zoubin/papers/chu05a.pdf>>, Journal of Machine Learning Research, vol. 6, Jul. 2005, pp. 1019-1041.

Dangauthier, et al., "TrueSkill Through Time: Revisiting the History of Chess", In Advances in Neural Information Processing Systems 20, 2008, pp. 1-8 (337-344).

Goldberg, et al, "Using Collaborative Filtering to Weave an Information Tapestry", Communications of the ACM, vol. 35, No. 12, 1992, pp. 61-70.

Gomes, Selman, "Algorithm Portfolio Design: Theory vs. Practice", retrieved on Oct. 13, 2009 at <<http://www.cs.cornell.edu/selman/papers/pdf/97.uai.algorithm.pdf>>, Proceedings of the Thirteenth Conference on Uncertainty in Artificial Intelligence, 1997, pp. 190-197.

Gomes, Selman, Crato, Kautz, "Heavy-Tailed Phenomena in Satisfiability and Constraint Satisfaction Problems", retrieved on Oct. 13, 2009 at <<http://www.cs.cornell.edu/gomes/jar.pdf>>, Kluwer Academic Publishers, Netherlands, Journal of Automated Reasoning, vol. 24, 2000, pp. 67-100.

Good, Schafer, Konstan, Borchers, Sarwar, Herlocker, Riedl, "Combining Collaborative Filtering with Personal Agents for Better Recommendations", retrieved on Oct. 13, 2009 at <<http://www.cs.ubc.ca/~conati/532b/papers/good-konstan-aaai-99.pdf>>, American Association for Artificial Intelligence, 1999, pp. 1-8.

Herbrich, et al., "TrueSkill: A Bayesian Skill Rating System", In Advances in Neural Information Processing Systems 20, 2007, pp. 1-9 (569-576).

Horvitz, Ruan, Gomes, Kautz, Selman, Chickering, "A Bayesian Approach to Tackling Hard Computational Problems", retrieved on Oct. 13, 2009 at <<ftp://ftp.research.microsoft.com/pub/ejh/uai2k1.pdf>>, Morgan Kaufmann Publishers: San Francisco, Proceedings of the Seventeenth Conference on Uncertainty and Artificial Intelligence, Aug. 2001, pp. 1-10.

Kschischang, Frey, Loeliger, "Factor Graphs and the Sum-Product Algorithm", retrieved on Oct. 13, 2009 at <<http://www.psi.toronto.edu/pubs/2001/frey2001factor.pdf>>, IEEE Transactions on Information Theory, vol. 47, No. 2, Feb. 2001, pp. 498-519.

Lam, et al., "Addressing Cold-Start Problem in Recommendation Systems", In Proceedings of the 2nd international conference on Ubiquitous information management and communication, 2008, pp. 208-211.

Lemire, Boley, McGrath, Ball, "Collaborative Filtering and Inference Rules for Context-Aware Learning Object Recommendation", retrieved on Oct. 13, 2009 at <<http://iit-iti.nrc-cnrc.gc.ca/iit-publications-iti/docs/NRC-48535.pdf>>, Troubador Publications, UK, Technology and Smart Education, vol. 2, No. 3, Aug. 2005. pp. 179-188.

Leyton-Brown, Nudelman, Shoham, "Empirical Hardness Models: Methodology and a Case Study on Combinatorial Auctions", retrieved on Oct. 13, 2009 at <<http://delivery.acm.org/10.1145/1540000/1538906/a22-leyton-brown.pdf?key1=1538906&key2=7885145521&coll=GUIDE&dl=GUIDE&CFID=56211091&CFTOKEN=34606863>>, Journal of the ACM, vol. 56, No. 4, Article 22, Jun. 2009, pp. 1-52.

Lim, et al., "Variational Bayesian Approach to Movie Rating Prediction", In Proceedings of KDD Cup and Workshop, 2007, pp. 15-21.

Minka, "Divergence Measures and Message Passing", retrieved on Oct. 13, 2009 at <<ftp://ftp.research.microsoft.com/pub/tr/TR-2005-173.pdf>>, Microsoft Research Ltd., Cambridge, Technical Report MSR-TR-2005-173, Dec. 7, 2005, pp. 1-17.

Netflix Cinematch, retrieved on Aug. 22, 2008 at <<http://beelan515-yahoo-com.wikidot.com/netflix-cinematch>>, pp. 1-2.

Pulina, Tacchella, "A Self-Adaptive Multi-Engine Solver for Quantified Boolean Formulas", retrieved on Oct. 13, 2009 at <<http://cat.inist.fr/?aModele=afficheN&cpsidt=21207737>>, Springer, Heidelberg, Constraints Journal, vol. 14, 2009, pp. 136.

Pulina, Tacchella, "Time to learn or time to forget?Strengths and weaknesses of a self-adaptive approach to reasoning in quantified Boolean formula", Conference on Principles and Practice of Constraint Programming (Doctoral Programme), 2008, pp. 66-71.

Resnick, Varian, "Recommender Systems", retrieved on Oct. 13, 2009 at <<http://delivery.acm.org/10.1145/250000/245121/p56-resnick.pdf?key1=245121&key2=0436145521&coll=GUIDE&dl=GUIDE&CFID=56212025&CFTOKEN=21185303>>, Communications of the ACM, vol. 40, No. 3, Mar. 1997, pp. 56-58.

Rice, "The Algorithm Selection Problem", Academic Press, Advances in Computers, vol. 15, 1976, pp. 65-118.

Salakhutdinov, et al., "Restricted Boltzmann Machines for Collaborative Filtering", In Proceedings of the 24th Annual International Conference on Machine Learning, 2007, pp. 791-798.

Samulowitz, "Solving Quantified Boolean Formulas", retrieved on Oct. 13, 2009 at <<o:\docs\MS6\0196US\KH9057.PDF>>, Graduate Department of Computer Science, University of Toronto (Doctoral Thesis), 2008, pp. 1-166.

Schafer, et al., "Recommender systems in E-commerce". In Proceedings of the 1st ACM Conference on Electronic commerce, ACM, 1999, pp. 158-166.

Smith-Miles, "Cross-Disciplinary Perspectives on Meta-Learning for Algorithm Selection", retrieved on Oct. 13, 2009 at <<http://delivery.acm.org/10.1145/1460000/1456656/a6-smith-miles.pdf?key1=1456656&key2=8216145521&coll=GUIDE&dl=GUIDE&CFID=56211554&CFTOKEN=77346948>>, ACM Computing Surveys, vol. 41, No. 1, Article 6, Dec. 2008, pp. 1-25.

Streeter, Smith, "New Techniques for Algorithm Portfolio Design", retrieved on Oct. 13, 2009 at <<http://uai2008.cs.helsinki.fi/UAI_camera_ready/streeter.pdf>>, The Robotics Institute Carnegie Mellon University, pp. 1-9.

Winn, "Variational Message Passing and its Applications", PhD thesis, Department of Physics, University of Cambridge, 2003, pp. ii-xii.

Xu, Flutter, Hoos, Leyton-Brown, "SATzilla: Portfolio-based Algorithm Selection for SAT", retrieved on Oct. 13, 2009 at <<http://www.aaai.org/Papers/JAIR/Vol32/JAIR-3214.pdf>>, Journal of Artificial Intelligence Research, vol. 32, Jun. 2008, pp. 565-606.

Bielinska, "Minimum Variance Prediction of Bilinear Time Series: Direct and Adaptive Versions", Journal of Forecasting, vol. 12., No. 6, Aug. 1993, pp. 459-480.

Billsus et al, "Adaptive News Access", The Adaptive Web, LNCS 4321, Springer-Verlag Berlin Heidelberg 2007, pp. 550-570.

Breeze, et al., "Empirical Analysis of Predictive Algorithms for Collaborative Filtering", Microsoft Research, Technical Report MSR-TR-98-12, Available at <<http://research.microsoft.com/pubs/69656/tr-98-12.pdf>>, Revised Oct. 1998, 21 pgs.

Chu et al, "Personalized Recommendation on Dynamic Content using Predictive Bilinear Models", WWW 2009 MADRID!, Track: Social Networks and Web 2.0/Session: Recommender Systems, pp. 691-700.

Claypool et al, "Inferring User Interest", Computer Science Technical Report Series, Worchester Polytechnic Institute, May 11, 2001 Computer Science Department, 100 Institute Road, Worcester, Massachusetts, pp. 1-23 (24 pages total).

Das et al., "Google News Personalization: Scalable Online Collaborative Filtering", WWW 2007/ Track: Industrial Practice and Experience, May 8-12, 2007, Banff, Alberta, Canada, pp. 271-280.

Huang, et al., "A Comparison of Collaborative-Filtering Recommendation Algorithms for E-Commerce", IEEE, Intelligent Systems, vol. 22, Issue 5, Sep.-Oct. 2007, pp. 68-78.

Linden, et al., "Amazon.com Recommendations: Item-to-Item Collaborative Filtering", IEEE, Internet Computing, vol. 7, Issue 1, Jan. 2003, pp. 76-80.

Liu, "Overfitting and forecasting:linear versus non-linear time series models", Iowa State University, Ames, Iowa, 2000, Bell & Howell Information and Learning Company, 300 North Zeeb Road, PO Box 1346, Ann Arbor, MI, pp. 1-110 (118 pages total.

Minka, "Bayesian inference in dynamic models—an overview", http://research.microsft.com/en-us/um/people/minka/papers/dynamic.html, retreived on Aug. 31, 2011, pp. 1-6.

Minka, "Expectation Propagation for Approximate Bayesian Inference", Statistics Dept, Carnegie Mellon University, Pittsburgh, PA, 8 pages.

Office Action for U.S. Appl. No. 12/253,854, mailed on Dec. 21, 2011, Ralf Herbrich, "Recommending Items to Users Utilizing a Bi-Linear Collaborative Filtering Model", 19 pgs.

Park et al, "Applying Collaborative Filtering Techniques to Movie Search for Better Ranking and Browsing", KDD Aug. 12-15, 2007, San Jose, CA, pp. 550-559.

Ranganathan, "Assumed Density Filtering", Nov. 23, 2004, 2 pages.

Richardson, et al., "Predicting Clicks: Estimating the Click-Through Rate for New Ads", In the Proceedings of the 16th International Conference on World Wide Web, 2007, pp. 521-530.

Stern, Herbrich, Graepel, "Matchbox: Large Scale Online Bayesian Recommendations", retrieved on Oct. 13, 2009 at <<http://www2009.org/proceedings/pdf/p111.pdf>>, International World Wide Web Conference Committee, WWW 2009, Apr. 20, 2009, pp. 111-120.

Wang, et al., "Probabilistic Relevance Ranking for Collaborative Filtering", ACM, Information Retrieval, vol. 11, Issue 6, Dec. 2008, pp. 477-497.

Watanabe et al, "Improvement of Collaborative Filtering Based on Fuzzy Reasoning Model", 2006 IEEE International Conference on Systems, Man, and Cybernetics, Oct 8-11, 2006 Taipei, Taiwan, pp. 4790-4795.

* cited by examiner

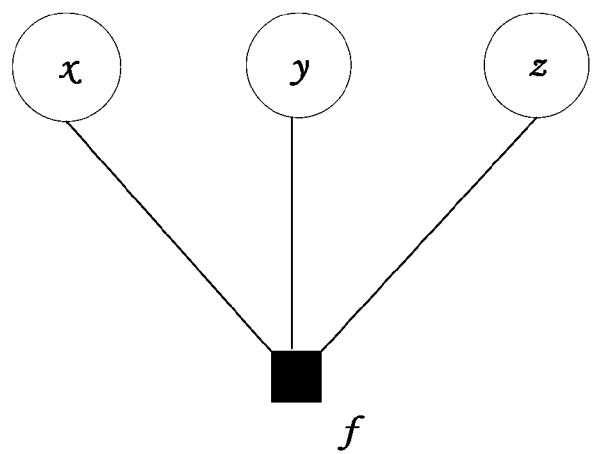
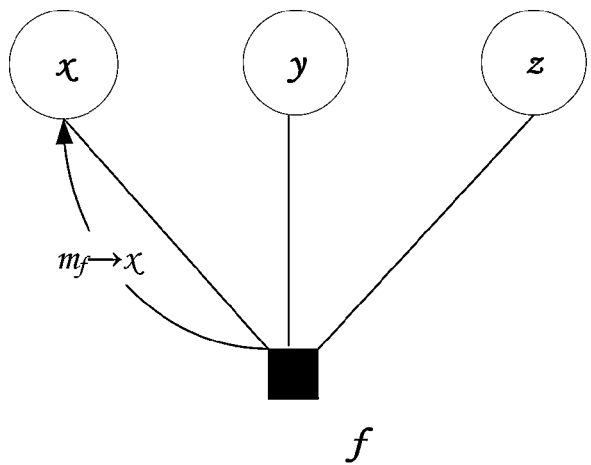
FIG. 8

| Factor | Update equation |
|---|---|
| $m_{f \to x}$, $N(x; m, v^2)$ | $\pi_x^{new} \leftarrow \pi_x + \dfrac{1}{v^2}$ $\tau_x^{new} \leftarrow \tau_x + \dfrac{m}{v^2}$ This is exact and should only be executed once |
| $m_{f \to x}$, $N(x; y, c^2)$ | $\pi_{f \to x}^{new} \leftarrow a\left(\pi_y - \pi_{f \to y}\right)$ $\tau_{f \to x}^{new} \leftarrow a\left(\tau_y - \tau_{f \to y}\right)$ $\pi_x^{new} \leftarrow \pi_x + \pi_{f \to x}^{new} - \pi_{f \to x}$ $\tau_x^{new} \leftarrow \tau_x + \tau_{f \to x}^{new} - \tau_{f \to x}$ $a := \dfrac{1}{1 + c^2\left(\pi_y - \pi_{f \to y}\right)}$ |
| $m_{f \to y}$, $N(x; y, c^2)$ — $m_{f \to y}$, $N(y; x, c^2)$ | |

FIG. 9

| Factor | Update equation |
|---|---|
| 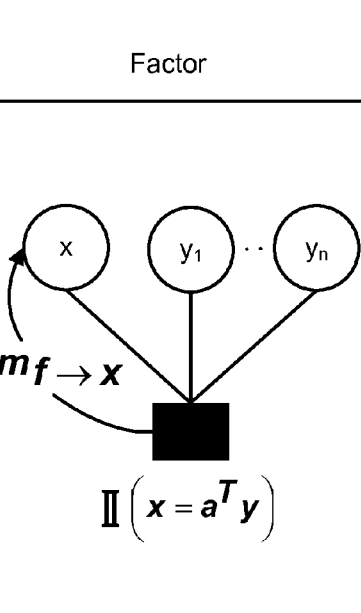 $\mathbb{I}(x = a^T y)$ | $\pi_{f \to x}^{new} \leftarrow \left( \sum_{j=1}^{n} \frac{a_j^2}{\pi_{y_j} - \pi_{f \to y_j}} \right)^{-1}$ $\tau_{f \to x}^{new} \leftarrow \pi_{f \to x}^{new} \cdot \left( \sum_{j=1}^{n} a_j \cdot \frac{\tau_{y_j} - \tau_{f \to y_j}}{\pi_{y_j} - \pi_{f \to y_j}} \right)$ $\pi_x^{new} \leftarrow \pi_x + \pi_{f \to x}^{new} - \pi_{f \to x}$ $\tau_x^{new} \leftarrow \tau_x + \tau_{f \to x}^{new} - \tau_{f \to x}$ |
| 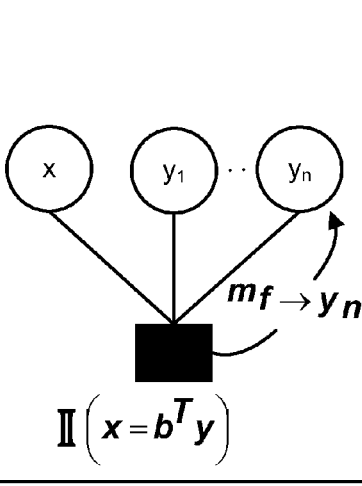 $\mathbb{I}(x = b^T y)$ | 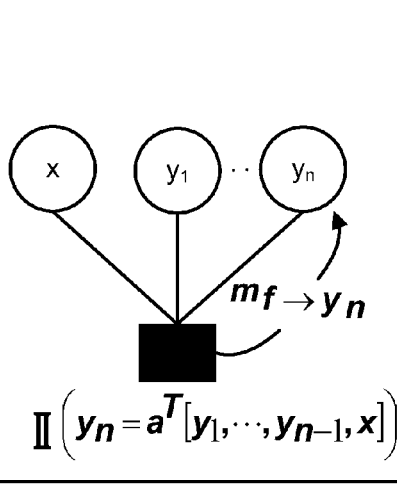 $\mathbb{I}(y_n = a^T [y_1, \cdots, y_{n-1}, x])$    $a = \frac{1}{b_n} \cdot \begin{bmatrix} -b_1 \\ \vdots \\ -b_{n-1} \\ +1 \end{bmatrix}$ |

FIG. 10

| Factor | Update equation |
|---|---|
| 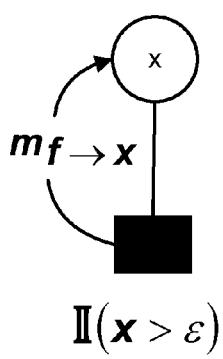 $\mathbb{I}(x > \varepsilon)$ | $\pi_x^{new} \leftarrow \dfrac{c}{1 - w\left(\dfrac{d}{\sqrt{c}}, \varepsilon\sqrt{c}\right)}$ $\tau_x^{new} \leftarrow \dfrac{d + \sqrt{c} \cdot v\left(\dfrac{d}{\sqrt{c}}, \varepsilon\sqrt{c}\right)}{1 - w\left(\dfrac{d}{\sqrt{c}}, \varepsilon\sqrt{c}\right)}$ $\pi_{f \to x}^{new} \leftarrow \pi_{f \to x} + \pi_x^{new} - \pi_x$ $\tau_{f \to x}^{new} \leftarrow \tau_{f \to x} + \tau_x^{new} - \tau_x$ $c = \pi_x - \pi_{f \to x}, \quad d = \tau_x - \tau_{f \to x}$ |
| 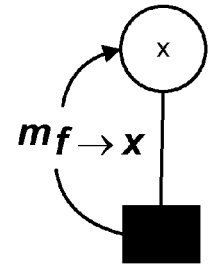 $\mathbb{I}(|x| \leq \varepsilon)$ | $\pi_x^{new} \leftarrow \dfrac{c}{1 - w_0\left(\dfrac{d}{\sqrt{c}}, \varepsilon\sqrt{c}\right)}$ $\tau_x^{new} \leftarrow \dfrac{d + \sqrt{c} \cdot v_0\left(\dfrac{d}{\sqrt{c}}, \varepsilon\sqrt{c}\right)}{1 - w_0\left(\dfrac{d}{\sqrt{c}}, \varepsilon\sqrt{c}\right)}$ $\pi_{f \to x}^{new} \leftarrow \pi_{f \to x} + \pi_x^{new} - \pi_x$ $\tau_{f \to x}^{new} \leftarrow \tau_{f \to x} + \tau_x^{new} - \tau_x$ $c = \pi_x - \pi_{m_x}, \quad d = \tau_x - \tau_{m_x}$ |

FIG. 11

MANAGING A PORTFOLIO OF EXPERTS

BACKGROUND

There are many situations in which it is required to manage a portfolio of experts such as automated problem solvers, algorithms, automated services or human experts in order to select the most appropriate expert for a given task. When faced with a diverse set of tasks, an approach which would be effective for all of those tasks is likely to be complex. It is therefore typically necessary to use a portfolio of experts which specialize on different types of task. However, there is then the problem of how to select the most appropriate expert for a given task from the portfolio of experts in an automated manner which is simple and effective.

The selection problem is further exacerbated since the nature of the tasks being solved may change with time and in addition, the performance of the experts may change.

An example class of tasks where an algorithm portfolio approach can be beneficial is solving hard combinatorial problems where typically, there does not exist one single approach that outperforms any other across a range of real-world problem instances. Because of their exponentially large search spaces, these problems are in general computationally intractable and depending on the properties of the problem one particular automated problem solver performs better than another according to some measure (e.g. runtime). A vast discrepancy in performance arises because solvers commit to different heuristic choices or employ different techniques. However it is difficult to produce an automated process for selecting the most appropriate automated problem solver to use from a portfolio of automated problem solvers given a particular task.

There is a need to enable expert selection systems to be updated on-the-fly such that expert performance feedback is taken into account as soon as possible. Where large numbers of experts and tasks are involved this problem is particularly acute.

The embodiments described below are not limited to implementations which solve any or all of the disadvantages of known automated expert selection systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Managing a portfolio of experts is described where the experts may be for example, automated experts or human experts. In an embodiment a selection engine selects an expert from a portfolio of experts and assigns the expert to a specified task. For example, the selection engine has a Bayesian machine learning system which is iteratively updated each time an expert's performance on a task is observed. For example, sparsely active binary task and expert feature vectors are input to the selection engine which maps those feature vectors to a multi-dimensional trait space using a mapping learnt by the machine learning system. In examples, an inner product of the mapped vectors gives an estimate of a probability distribution over expert performance. In an embodiment the experts are automated problem solvers and the task is a hard combinatorial problem such as a constraint satisfaction problem or combinatorial auction.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 8 shows two example factor graphs;

FIGS. 9 and 10 are tables of message update equations for exact factor nodes;

FIG. 11 is a table of message update equations for order factor nodes;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
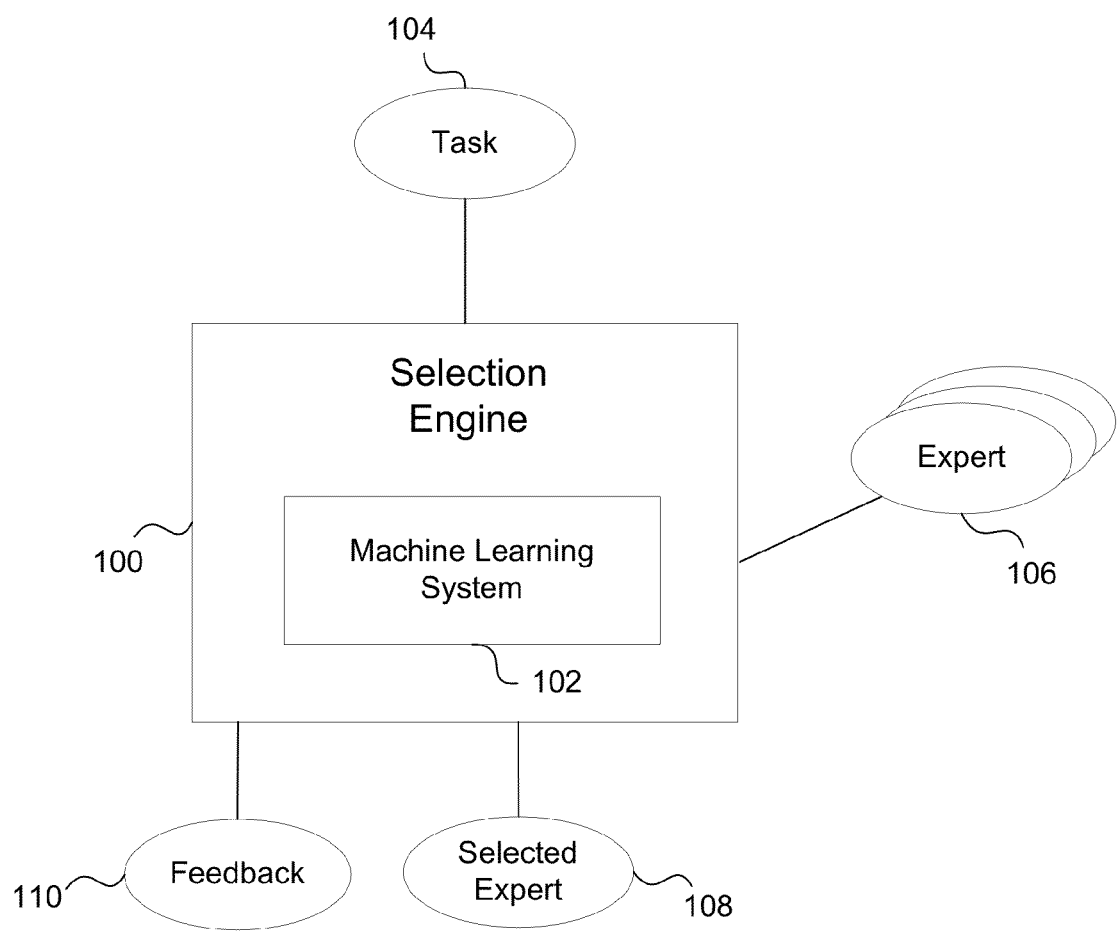
FIG. 1 is a schematic diagram of an expert selection engine.

FIG. 1 is a schematic diagram of a computer implemented selection engine 100 which comprises a machine learning system 102. The selection engine is arranged to receive a task 104 and to select an expert to perform that task from a portfolio of experts 106. The task may be any problem, piece of work, game or service. A non-exhaustive list of example types of task is: hard combinatorial problems (for example, constraint satisfaction problems/optimization problems), programming tasks, question for a human expert, services, games.

The portfolio of experts comprises two or more experts which may be human experts or automated experts or combinations of these. An example of an automated expert is a computer chess player, an automated algorithm for solving a hard combinatorial problem (for example, a constraint satisfaction problem solver or an optimization algorithm), a programming language.

The machine learning system 102 is computer implemented and is integral with the selection engine 100. It comprises a bi-linear probabilistic model of expert performance which is arranged to be trained incrementally using a Bayesian update process as described in more detail below. The selection engine 100 combines collaborative filtering with a feature-based description of tasks and experts to yield a general framework for managing a portfolio of experts. The machine learning system receives a feature vector for the task 104 and feature vectors for the experts in the portfolio of experts 106. It outputs an identifier of an expert selected from the portfolio of experts 106. The selected expert performs the task 104 and the performance is observed. The results of the observation are received by the selection engine as feedback 110 and used by the machine learning system 102 to update the bi-linear model of expert performance. The component of the selection engine 100 which takes into account the performance feedback 110 is modular and pluggable allowing flexibility. For example, in order to use different types of feedback according to the particular problem domain.

Figure 2:
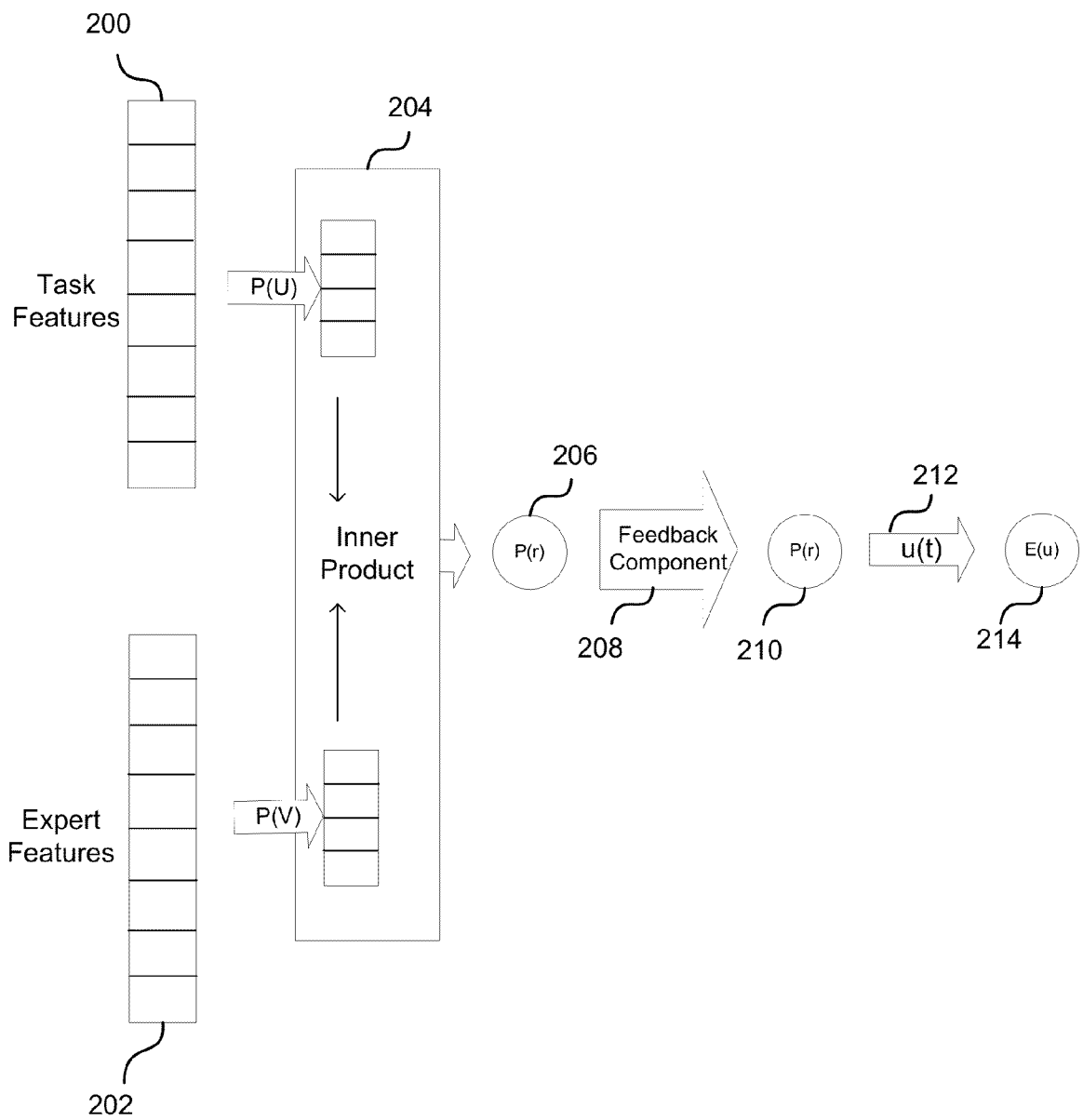
FIG. 2 is a schematic diagram of a bi-linear model for use by an expert selection engine.

As mentioned above, the machine learning system at the selection engine comprises a bi-linear probabilistic model of expert performance. FIG. 2 is a schematic diagram of this model at the selection engine.

For example, the model combines two linear models, one of an expert and one of a task. For example, each task is represented by a set of numeric (real valued) features, x 200. For example, each expert is represented by a set of features, y 202. In some examples the features may be binary although any numeric (real valued) features may be used. In the following description, an index over features is denoted by j. Each feature is mapped (via the matrices U and V (P(U) and P(V) in FIG. 2) to a vector of floating-point numbers referred to herein as a "trait vector" as each element of the trait vector corresponds to a particular trait of the feature. The trait vectors are illustrated in multi-dimensional trait space 204 in FIG. 2. The ith trait of expert feature j is denoted $v_{ij}$ in the following. The ith trait of task feature j is denoted $u_{ij}$ in the following. Any suitable data structure may be used to store these vectors such as an array, list, or a hash table.

For each task it is possible to calculate a total trait vector s as a weighted sum of all task feature trait vectors, weighted by the feature values, x, which depend on the task in question. Similarly, for each expert it is possible to calculate a single trait vector t as a weighted sum of all expert feature trait vectors with the weights, y, depending on the expert in question. In some embodiments sparsely active binary features are used such as task "ID=1234" or "nodes>500,000" and the total task trait vector may then be calculated by summing the task trait vectors for each of the features active for the particular task (corresponding to the non-zero elements of x). By using a sparse representation in this way it is possible to provide a system which works even for huge amounts of data.

For example, in this case where the experts are automated problem solvers and the tasks are problem instances of hard combinatorial problems then the tasks may be represented using a graphical encoding. The graphical encoding may compromise nodes which represent variables and hyper-arcs connecting the nodes, which represent constraints between sub-sets of variables and/or binary constraints. The problem instance features may be for example the number of hyper-arcs in the graphical encoding, the average number of hyper-arcs per node, the number of hyper-arcs in the graphical encoding divided by the number of hyper-arcs in a complete graph with the same number of nodes, and any other such features relating to the nodes and/or hyper-arcs; and any combinations of such features. However, these are examples only; any problem features may be used. In the case where the experts are automated problem solvers the expert features may comprise a unique identifier of the solver and/or any other feature describing characteristics of the solver.

The selection engine comprises linear model for each expert trait vector given by:

$$t_i = \sum_j v_{ij} y_j$$

and a linear model for each task trait vector given by:

$$s_i \sum_j u_{ij} x_j$$

where $u_{ij}$ and $v_{ij}$ are the latent feature trait values to be learnt as described below and x is a task feature vector and y is an expert feature vector.

As illustrated in FIG. 2 each feature is mapped using the mapping matrices to a trait vector. The selection engine 100 maintains probability distributions P(U) and P(V) over mapping matrices (rather than point estimates) so a probability distribution is obtained over each trait vector and hence a probability distribution over the predicted expert performance. The inner product of the trait vectors (as indicated in FIG. 2) is formed at the selection engine and this provides an estimate of a probability distribution p(r) 206 over the expert's performance r on the task. The performance of the expert r is referred to as a latent performance as it is an unobserved variable. However, it is not essential to use an inner product as described above. Any similarity measure arranged to provide an indication of the similarity of the trait vectors may be used.

The combination rule for combining the two linear models may comprise an inner product of the latent expert traits and latent task traits:

latent performance, r, (which is the performance r of the expert) is proportional to $s^T t$. The inner product is comprised of the sum over the pairwise products of the components.

Feedback is obtained by observing the expert's performance on the task. A feedback component 208 at the selection engine uses the feedback to update the bilinear model as described in more detail below to obtain an updated probability distribution 210 over expert performance. A utility function 212 may then be used to select 214 one of the experts for assigning to the task. More detail about use of a utility function is given below.

Figure 3:
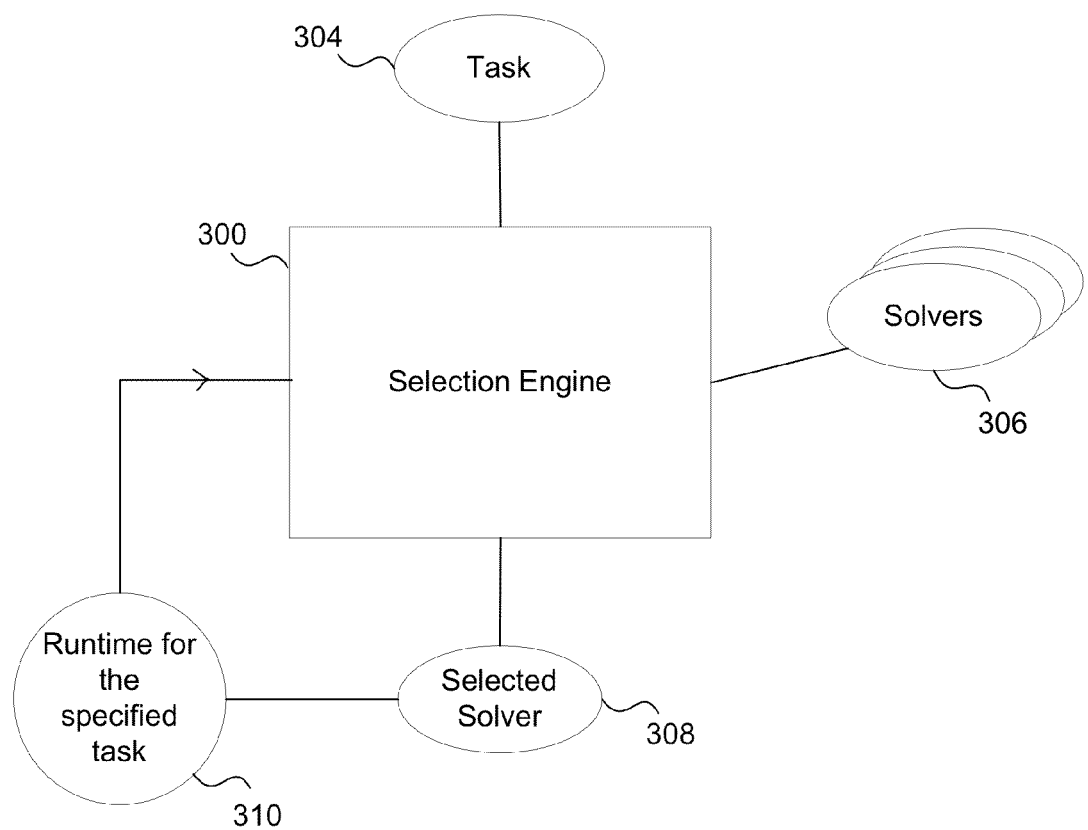
FIG. 3 is a schematic diagram of a selection engine arranged to select automated problem solvers from a portfolio of such solvers.

FIG. 3 is a schematic diagram of a selection engine 300 configured to operate in conjunction with a portfolio of automated problem solvers 306 in order to solve hard combinatorial problems such as task 304. In this case the task has one or more features which are input to the selection engine 300 and these may be features describing a graphical representation of a problem instance as mentioned above. Features of the solvers 306 are also input to the selection engine. The selection engine 300 uses a bi-linear model to compute a predicted probability distribution over expert performance and this is used to select one of the solvers for assigning the particular task 304. A specified utility function may be used as part of this selection process at the selection engine 300. The utility function may be input by an operator or may be accessed from any entity in communication with the selection engine 300. For example, the utility function has two parameters, a benefit b of completing the task and a cost c per unit of a performance measure of the expert in completing the task.

For example, the performance measure may be time such as the runtime of an automated solver to find a solution to a constraint satisfaction problem. In this case an example utility function may be defined as:

$$u(t) = \begin{cases} b - ct & \text{if } t < T \\ -cT & \text{otherwise.} \end{cases}$$

Where T is a time out period after which an automated problem solver stops attempting to solve a problem instance without finding a potential solution; and t is the predicted runtime for a given problem and solver combination as determined by the selection engine.

The selection engine is trained in such a manner that it is able to assign previously unseen tasks to experts in the portfolio of experts. More detail about the training process is now given.

Figure 4:
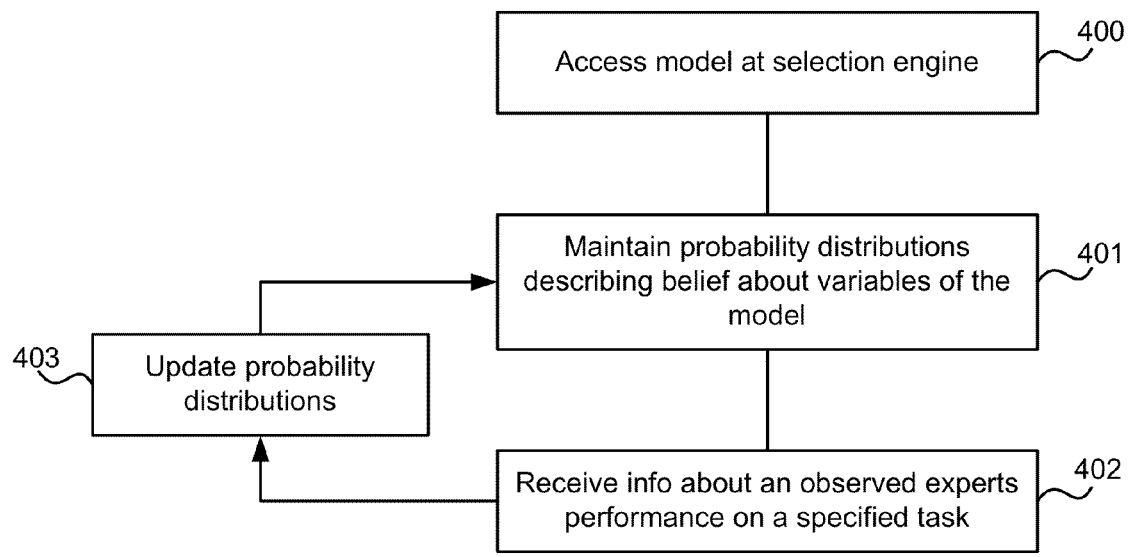
FIG. 4 is a block diagram of an example method of training an expert selection engine.

Parameters of the model need to be learnt during training. For example, FIG. 2 illustrates variables U and V which determine how tasks and experts are mapped to the K dimensional trait space and which need to be learnt. In addition, the value of bias features need to be learnt as described in more detail below. The prior beliefs about the values of these parameters are represented at the selection engine using probability distributions. With reference to FIG. 4 the selection engine stores 400 a bilinear model as described above and maintains probability distributions describing belief about the variables of the model (block 401). Any suitable probability distribution type may be used such as a Gaussian distribution. When information is received about an observed task, expert and associated performance (block 402) this information is used to update the probability distributions (block 403). This update process may be repeated for all available historical data.

Learning a probability distribution for each model variable is a complex and technically difficult task requiring significant memory resources. In an embodiment, assumed-density filtering is used to achieve this learning process and particular data structures, referred to as factor graphs, are formed in memory. Performance of experts on tasks may be observed one at a time and the observed information is incorporated into the model before moving on to the next observation (as explained above with reference to FIG. 4). In this way memory overhead may be reduced and the recommender system is able to update immediately after each rating without the need to revisit old data.

Figure 5:
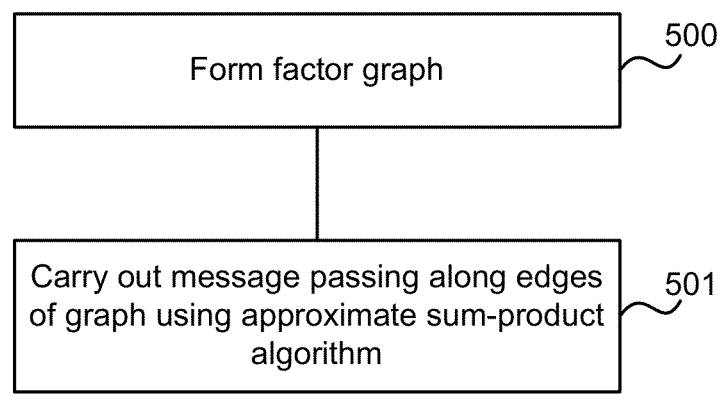
FIG. 5 gives more detail of an example of part of the method of FIG. 4.

In an embodiment the update process is carried out by arranging the selection engine to build a factor graph in memory (see 500 of FIG. 5) for each observation. Some of the nodes of the factor graph are instantiated with the observed task, expert and performance information and message passing is carried out along edges of the factor graph using an approximate sum-product algorithm (block 501). Approximations may be made using Expectation Propagation (EP) and Variational Message Passing (VMP). In this way, statistics describing the probability distributions are updated (block 403 of FIG. 4).

Once the model is trained it is possible to carry out prediction for a new pair of task features x and expert features y. In this way a predicted latent rating is obtained for a specified task and expert pair. This may be repeated to obtain predicted latent performances for many experts given a particular task. Using the predicted latent performances experts may then be selected for assigning to the task.

In some embodiments the selection engine 100 is arranged to output the learnt multi-dimensional trait space to a display system using a suitable data visualization process. For example, this is particularly useful where the multi-dimensional trait space has only three or only two dimensions so that a 2D display device may be used to present a graphical representation of the multi-dimensional trait space. A user is then able to quickly review the data visually and identify similar experts and/or similar tasks.

The method described with respect to FIG. 4 may also be used to update the model on the fly as new tasks are performed, without having to revisit previous data. Because it is not necessary to revisit previous data the selection engine is very efficient. As a result, the system is able to adapt to a new task type immediately even within a single session. In addition, in some embodiments, the selection engine is arranged to take into account the effect of a task's requirements and an expert's ability changing with time.

Figure 6:
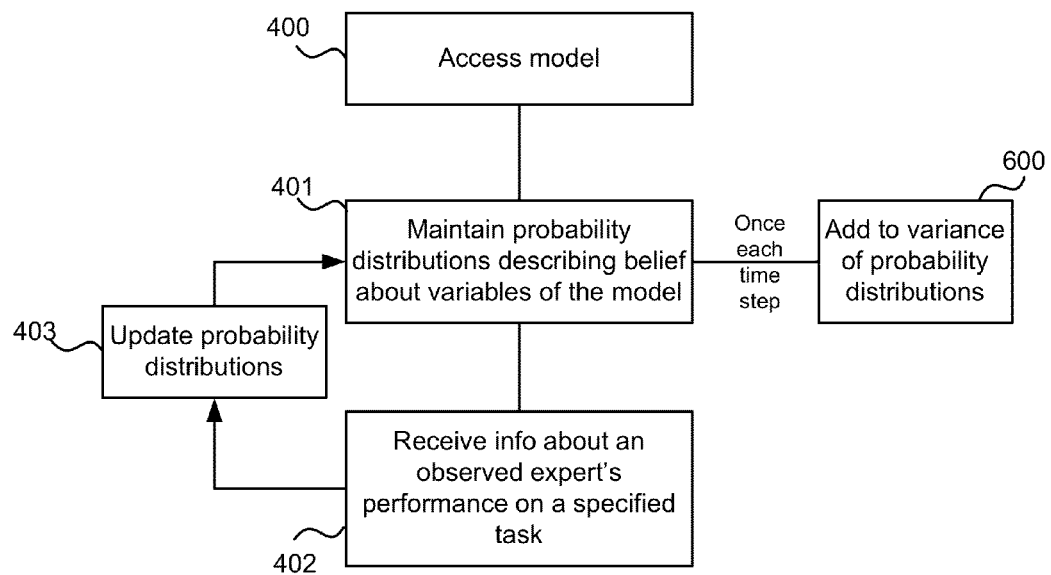
FIG. 6 is a flow diagram of an example method of operating a selection engine.

In some embodiments the expert selection system is arranged to take into account the possibility of tasks changing with time and/or experts ability changing with time. This is achieved by increasing the variance of the probability distribution associated with each latent trait at specified time intervals. For example, the time interval may be a day so that the variance is increased once per day. Any other suitable time step may be used depending on the particular application that the selection engine is being used for. For example, the variance may be increased by adding Gaussian noise to the probability distribution (which may be a Gaussian distribution). FIG. 6 is the same as FIG. 4 and in addition shows the step 600 at which the variance of the probability distributions may be increased.

In an embodiment such as that illustrated with respect to FIG. 3 the selection engine incorporates a feedback module which is arranged to use feedback in the form of runtimes taken to complete the task (or reach a time out). The experts are automated problem solvers and a time out T is specified after which the solver finishes and the problem is considered not solved. Typically the distribution over the time it takes for automated solvers to solve hard combinatorial problems has a long tail. With a modest time out this manifest itself as a bi-modality with many tasks being solved quite quickly but also many reaching time-out with the remaining solution times being roughly evenly distributed between the time-out and the peak of fast solutions. The selection engine is arranged to represent the run time as a uniform distribution given a latent rank, l, of the performance of a solver on the task leaving to a piecewise constant predictive distribution for time:

$$p(t \mid l = 1) = I(t = T) \quad \text{(time out)},$$

$$p(t \mid l = 2) = \begin{cases} \dfrac{1}{T - t_c} & \text{if } t_c < t < T \\ 0 & \text{otherwise} \end{cases} \quad \text{(slow solution)},$$

$$p(t \mid l = 3) = \begin{cases} \dfrac{1}{t_c} & \text{if } t < t_c \\ 0 & \text{otherwise} \end{cases} \quad \text{(fast solution)},$$

Where $t_c$ is the fixed (fixed) cut-off time between a 'fast' solution and a 'slow' solution, typically $t_c \ll T$. If l=1 the solver reached time out, if l=2 the solver solved the problem slowly and if l=3 the solver solved the problem quickly.

The ranks, l, can be compared but not subtracted from one another. The mapping from rank to latent performance may not be linear and this mapping can change from solver to solver.

The latent performance r is related to ranks l via a cumulative threshold model. For each solver, v, the selection engine maintains solver-specific thresholds $h_v \in R^2$ which divide the latent rating axis into three consecutive intervals $(h_{v(i-1)}, h_{v(i)})$ each of which represents the region in which this solver attains a performance in the same rank. Formally, a generative model of a ranking is:

$$p(l=a \mid h_v, r) = \begin{cases} I(r < \tilde{h}_{v0})I(r < \tilde{h}_{v1}) \text{ if } a=1 \\ I(r > \tilde{h}_{v0})I(r < \tilde{h}_{v1}) \text{ if } a=2 \\ I(r > \tilde{h}_{v0})I(r > \tilde{h}_{v1}) \text{ if } a=3, \end{cases}$$

Where $p(\tilde{h}_{vi} \mid h_{vi}, \tau) = N(\tilde{h}_{vi}, h_{vi}, \tau^2)$, and an independent Gaussian prior is placed on the thresholds so $p(h_{vi}) = N(h_{vi}; \mu_i, \sigma_i^2)$. The indicator function $I(\circ)$ is equal to 1 if the proposition in the argument is true and 0 otherwise. Inference for the ordinal regression observation model is performed by approximate Gaussian EP message passing on the factor graph as described in detail in D. Stern, R. Herbrich, and T. Graepel. "Matchbox: Large Scale Online Bayesian Recommendations". In *WWW '09: Proceedings of the 18th International Conference on World Wide Web*, pages 111-120, New York, N.Y., USA, 2009. ACM Press which is incorporated herein in it entirety by reference. This calculation is performed for each iteration of the main message passing schedule described below. Note that the marginal distribution for each solver threshold must be stored.

A particular example is now described in detail.

In an example, the selection engine receives triples $(x, y, r)$ of task descriptions $\chi \in \mathbb{R}^n$, expert descriptions $\gamma \in \mathbb{R}^n$ and a performance score $r \in \mathbb{R}$ indicating the degree of success of the expert on this task. The model assumes that there exists a latent performance score $r \in \mathbb{R}$ which is stochastically generated as follows:

$$p(r \mid x, y, U, V, u, v) := N(r; \bar{r}(x, y, U, V, u, v), \beta^2), \quad (1)$$

where $N(t; \mu, \sigma^2)$ denotes the density at t of a Gaussian distribution with mean $\mu$ and variance $\sigma^2$. The expected performance score is given by $$\bar{r}(x, y, U, V, u, v) := x^T U^T V y + x^T u + y^T v. \quad (2)$$

The matrices $U \in \mathbb{R}^{K \times n}$ and $V \in \mathbb{R}^{K \times n}$ and the vectors $u \in \mathbb{R}^n$ and $v \in \mathbb{R}^n$ are the variables of the model which map both tasks and experts into the latent K-dimensional trait space via $s := Ux$ and via $t := Vy$. The expected performance score is then determined as the inner product between the low dimensional task and expert representations shifted by both a task specific bias $x^T u$ and an expert specific bias $y^T v$. Hence, the more aligned the vectors s and t are, the higher the expected performance score r. Also, the expected performance score is proportional to the length $\|s\|$ of the latent task traits and to the length $\|t\|$ of the latent expert traits. The model may use low dimensional representations of both tasks and experts. This enables the selection system to generalize across tasks and experts, i.e., to learn from one task about another and from one expert about another. Working with a small number K of latent traits, K<<m and K<<n, also has benefits in that the number of model variables to be stored is small. Both tasks and experts can be described by arbitrary features.

In order to address the issue of adapting to time-varying user preferences, item popularity and user rank models, the selection engine may arrange the latent variables U, V, u, v and b to vary with time. For example, for the threshold b a Gaussian dynamics model may be used, where $$p(b_l^{(t+1)} \mid b_l^{(t)}) = N(b_l^{(t+1)}; b_l^{(t)}, \tau_b^2).$$

Note that this dynamics model is anchored at $(t_0)$ where $b_l$ and $\tau_b^2$ are replaced by a prior mean $\mu_b$ and variances of $\sigma_b^2$. An analogous model is used for all other latent variables. Here, superscripts (t) are used for time series indices; this should not be confused with the (t)th power.

The model parameters to be learned are the variables U, V, u, v and b which determine how tasks and experts are mapped to the K-dimensional trait space and how similarity in the trait space is mapped to a performance score. Since the amount of data per task and/or per expert is scarce, the selection engine maintains knowledge of the uncertainty about the unknown quantities. In some embodiments the knowledge about these parameters is stored at the selection engine in terms of factorising Gaussian probability distributions. Complete factorisation of all these parameters may then be assumed:

$$p(U) = \prod_{k=1}^{K} \prod_{i=1}^{n} N(u_{k,i}; \mu_{k,i}, i, \sigma_{k,i}^2). \quad (3)$$

For each of the components of the matrices U and V and each of the components of the vectors u, v and b, the selection engine maintains a Gaussian belief. Given a stream of ranking triples (x, y, r) approximate posterior distributions for the parameters are learned using an example inference method discussed below.

As mentioned above, for each observed performance score, a small factor graph is formed in memory by the selection engine. More detail about the process of forming the factor graph is now given with reference to FIG. 7. The factor graph comprises nodes 702, 703, 704, 705 connected by links 701. The nodes are either variable nodes (circles) or factor nodes (rectangles). Variable nodes represent storage locations and factor nodes represent computational units. The factor nodes read and write information to their neighboring variable nodes according to calculation rules described later.

Figure 7:
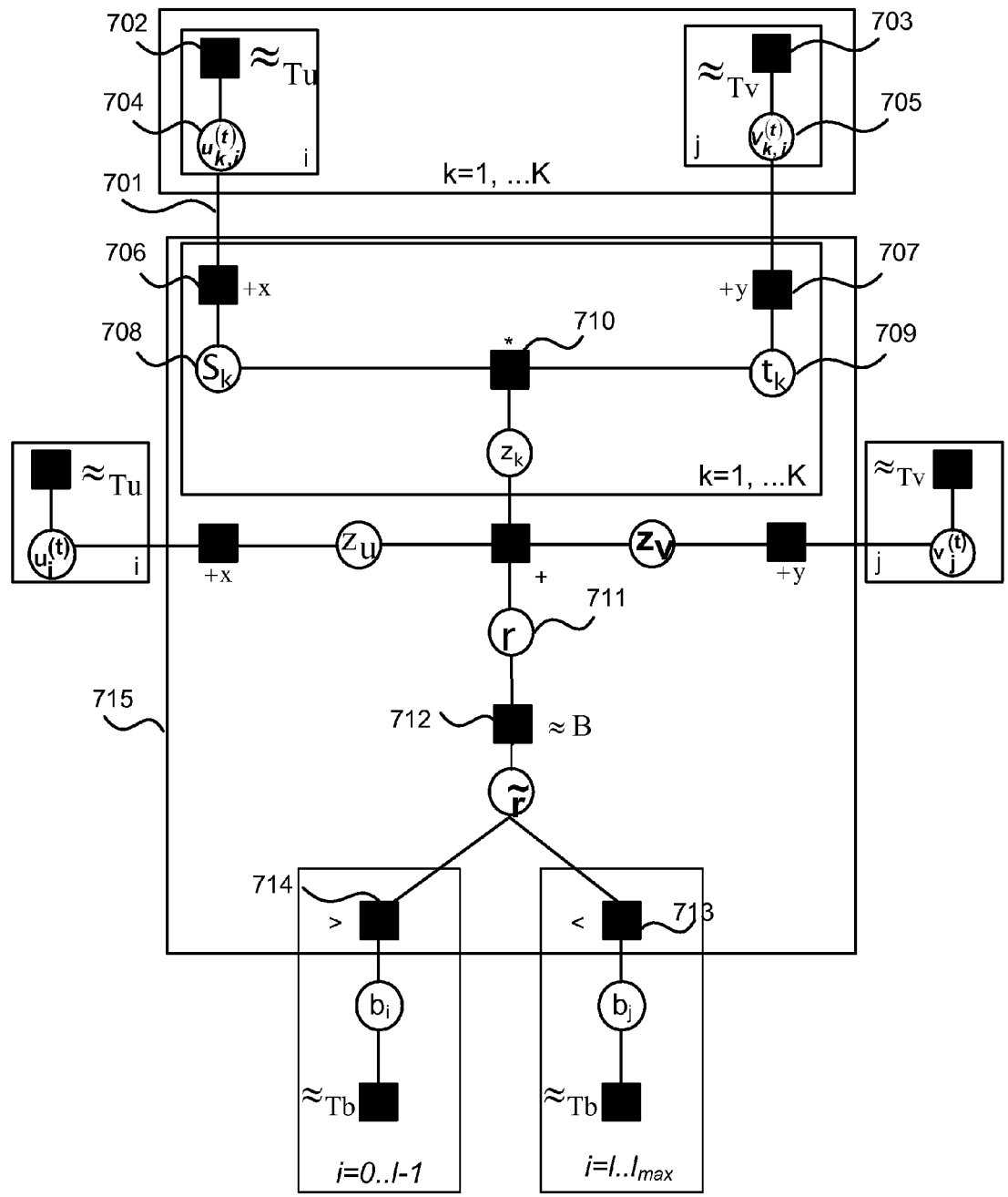
FIG. 7 is an example factor graph.

The factor graph of FIG. 7 is for a single performance score triple (x, y, r). In this example, all the variables are one dimensional Gaussian variables. The factor nodes 702, 703 at the top of the diagram are functions which access a database or other store to obtain belief distributions for the task traits 702 and experts traits 703. These computational units feed parameters describing the trait belief distributions into the corresponding variable nodes 704, 705.

A weighted sum is carried out represented by factor nodes 706 and 707 to obtain the latent task trait 708 and latent expert trait 709 belief distributions.

A product factor labeled * in FIG. 7 (reference numeral 710) is applied to take the inner product of the latent task trait and latent expert trait and obtain the latent performance score 711. Z_k is the result of the product for trait k. The variance of the belief distribution for the latent performance score may be increased using the factor 713 ($\approx \beta$) which can be thought of as adding noise to the distribution. Similarly, factors 712 ($\approx \gamma$) add noise.

The shaded box 715 of FIG. 7 indicates the part of the factor graph which may be considered as a factor-node itself which performs its message update equations by iterating message passing within. This structure of the factor graph is particularly useful for enabling the selection engine to use parallel processing.

The factor graph of FIG. 7 is a data structure which may be physically represented in memory in a computer system arranged to provide the selection engine. It is formed by the selection engine in order to specify the model of equations (1), (2) and (3) above. In FIG. 7, plate notation is used as a short-hand for replicating parts of the factor graph over the task variables i∈{1, . . . , n}, expert variables j∈{1, . . . , m} and latent trait space dimensions k∈{1, . . . , K}. Inference in this model is performed using message passing along the edges of the graph using the sum-product algorithm as described in F. R. Kschischang, B. Frey and H.-A. Loeliger "Factor graphs and the sum-product algorithm", IEEE Trans. Inform. Theory, 47(2):498-519, 2001, which is incorporated herein by reference in its entirety.

The process of message passing comprises carrying out a calculation associated with a factor node (square node in FIG. 7) using distribution parameters from neighbouring variable nodes and passing the results to one of the neighbouring variable nodes (circular nodes in FIG. 8). The direction of passing the results (also referred to as a processing schedule) is explained in more detail now.

The processing schedule is preferably divided into three phases: pre-processing, chain processing, and post-processing. An example pre-processing schedule starts at the top factor nodes (702, 703). Computation proceeds downward along each column until the s and t variables are reached (nodes 708 and 709). The post processing schedule is the reverse of the pre-processing schedule but stopping at the trait nodes 704, 705. The chain processing schedule involves iterating the calculations of the messages within region 715 of FIG. 7 until their values no longer change substantially.

Each message that is passed in the processing schedules represents a non-trivial calculation and details of those calculations are given below.

General update equations for use in carrying out the computations along the arrows in the message passing process are now given. Those general update equations are tailored for use with Gaussian distributions as shown.

Factor Node Update with Gaussian Messages

Consider the factor graph of FIG. 8.

Suppose it is required to update the message $m_{f \to x}$ and the marginal $p_x$. Then, the general update equations are as follows:

$$m_{x \to f}(x) \propto \frac{p_x(x)}{m_{f \to x}(x)},$$

$$m_{f \to x}^{true}(x) \propto \int \int f(x, y, z) \cdot \frac{P_y(y)}{m_{f \to y}(y)} \cdot \frac{P_z(z)}{m_{f \to z}(z)} dy dz$$

$$p_x(x) = MM[m_{f \to x}^{true}(x) m_{x \to f}(x)],$$

$$m_{f \to x}(x) \propto \frac{P_x(x)}{m_{x \to f}(x)},$$

where MM[•] returns the distribution in the Gaussian family with the same moments as the argument and all quantities on the right are normalized to be distributions. In the following the exponential representation of the Gaussian is used, that is, $$G(x; \tau, \pi) \propto \exp(\pi x^2 - 2\tau \pi)$$

This density has the following relation to the standard density $$G(x; \tau, \pi) = N\left(x; \frac{\tau}{\pi}, \frac{1}{\pi}\right), \text{ or } N(x; \mu, \sigma^2) = G\left(x; \frac{\mu}{\sigma^2}, \frac{1}{\sigma^2}\right)$$

In the case of exact factor nodes the update equations are given in FIGS. 9 and 10. In the case of order factor nodes such as 713 and 714 in FIG. 7, the update equations are given in FIG. 11.

In these update equations the symbol a represents weightings which in a preferred example are set to 1. Also, in the update equations v and w correspond to:

$$V(t) = \frac{N(t)}{\Phi(t)}$$

$$w(t) = V(t) \cdot (V(t) + t)$$

The following approximate message equations may be used for the product factor 710. $f(s_k, t_k, z_k)$=identity function $(z_k = s_k \cdot t_k)$. For the rest of this paragraph the index of the latent dimension, k, is dropped and the equations below correspond to a single latent dimension.

$$m_{* \to z} = N(z; \langle s \rangle \langle t \rangle, \langle s^2 \rangle \langle t^2 \rangle - \langle s^2 \rangle \langle t^2 \rangle),$$

$$m_{* \to s} = N\left(s; \frac{\langle z \rangle \langle t \rangle}{t^2}, \frac{\langle z^2 \rangle - \langle z \rangle^2}{\langle t^2 \rangle}\right),$$

Here, $\langle t \rangle$ denotes the mean of the marginal p(t) and $\langle t^2 \rangle$ denotes the non-centred second moment of the message marginal p(t). Marginals are used for the inputs for the product factor as this update is a Variational approximation instead of an EP approximation (unlike the other factors in the model). These marginals may be obtained by multiplying all messages into the s and t variables (including the upward messages), hence the process of iterating the computation until convergence. The upward messages into the s and t variables are not initially available so in the first iteration these may be set to uniform distributions. The message for $m^*_{\to t}$ is obtained from $m^*_{\to s}$ by swapping the roles of s and t. $\langle z \rangle$ denotes the mean of the message from the sum factor upwards to the zk variable.

In some embodiments assumed density filtering is used whereby the processing schedule is arranged such that the inference algorithm only passes messages forward in time.

In the example of FIG. 7, in order to carry out prediction on a new pair of task x and expert y, the recommender system is arranged to loop through all possible values for the performance score and compute the evidence of the full factor graph. Due to the approximate nature of the factors >, < and *, the sum of all evidences is not one and evidences may be re-normalised to arrive at a probability distribution over expert performance ranks l via a cumulative threshold model as described above giving: probability $\pi_l$:=p(l|x, y, D). D represents the whole sequence of ranking triples in a training set.

The message passing process may be parallelised by exploiting that the incoming messages from a variable to a factor, $m_{i \to f}$, are ideally computed by dividing a cache of $p(u_i)$ by the message $m_{f \to i}$. Hence, as long as both the cache $p(u_i)$ and the incoming message $m_{f \to i}$ are updated in one atomic step, computations based on various messages from variables $u_i$ to $m_{i \to f}$ can be parallelised. Thus, all the message exchanges within box 715 in FIG. 7 may be performed in parallel over all triples provided that the updates of the messages and cached marginals over all elements in U, V, u, v and b are performed with a read-write lock. This can lead to a nearly linear performance increase over the number of cores in modern computers.

In an embodiment the experts are automated quantified Boolean formula (QBF) solvers and the tasks are problems represented using QBF. In this case the selection engine was configured to use a time out T of 600 seconds and the value for $t_c$ was set to 50 seconds. Experiments were performed using 2282 test problems and 288 training instances. The utility function mentioned above was used with b=1 and c=1/T. The selection engine was trained using 20 iterations of expectation propagation in a training phase. The performance of the selection engine using a portfolio of solvers was then assessed empirically and compared with the performance of an ideal portfolio manager (referred to herein as "oracle") which always selects the fastest solver for each task. The selection engine was found to solve 2102 of the 2282 problems with an average time per task of 13.7 seconds and with a total utility of 1873. In comparison the oracle solved 2240 of the 2282 problems with an average time per task of 12.8 seconds and with a total utility of 2150. A comparison was also made with a number of known individual solvers and the selection engine gave better performance than each of these.

In another example the experts are automated problem solvers arranged to solve combinatorial auctions and the tasks are combinatorial auctions for which winners need to be determined. A combinatorial auction involves self-interested agents bidding for bundles of good while being guaranteed that the allocation of a bundle is all or nothing. The winner determination problem aims at answering the question of which bids should be accepted or not in an optimal fashion. The selection engine was configured to use a time out of 7500 seconds and using the same utility as before c=1/T and b=1. The performance of the selection was assessed empirically and compared to an oracle as described above. It was found that as K (the number of latent space dimensions) increases the number of solved instances increased and the average run-time was halved. The utility of the selection engine with K=3 was far better than that achieved by any single solver.

Figure 12:
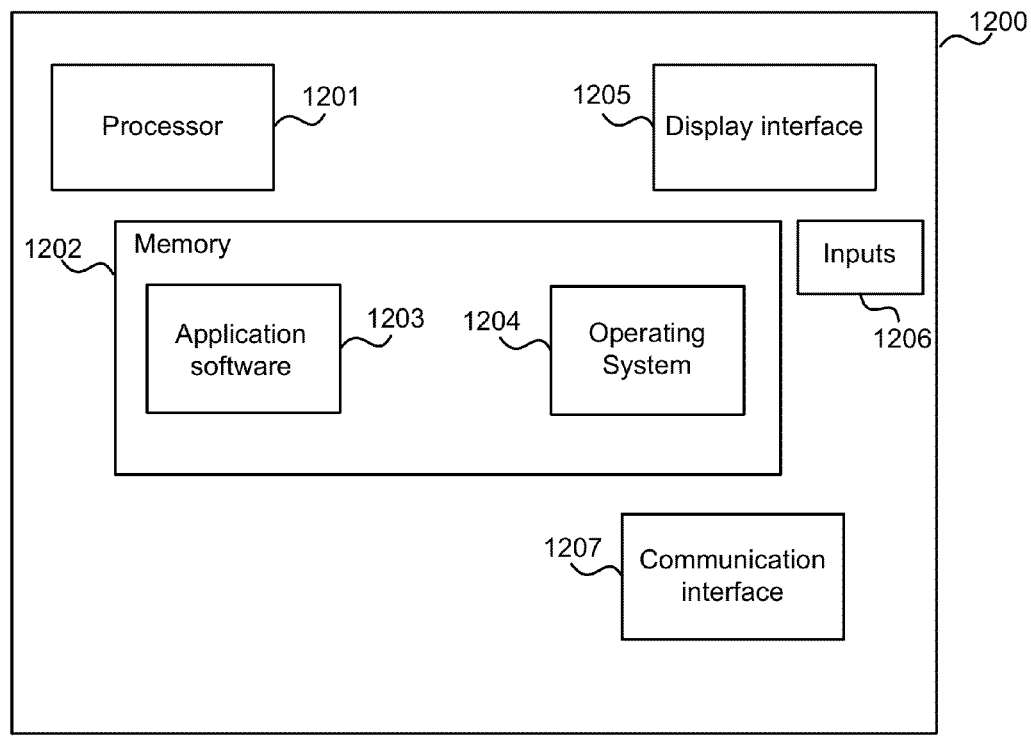
FIG. 12 illustrates an exemplary computing-based device in which embodiments of a selection engine may be implemented.

FIG. 12 illustrates various components of an exemplary computing-based device 1400 which may be implemented as any form of a computing and/or electronic device, and in which embodiments of a selection engine may be implemented.

The computing-based device 1200 comprises one or more inputs 1206 which are of any suitable type for receiving media content, Internet Protocol (IP) input, and including observed performance scores, information about tasks and information about experts. The device also comprises communication interface 1207 to enable the selection engine to access and communicate with other entities such as databases, search engines, web servers and the like.

Computing-based device 1200 also comprises one or more processors 1201 which may be microprocessors, controllers or any other suitable type of processors for processing computing executable instructions to control the operation of the device in order to assign tasks to experts. Platform software comprising an operating system 1202 or any other suitable platform software may be provided at the computing-based device to enable application software 1203 to be executed on the device.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of selecting an expert, the method comprising the steps of:
   receiving at least one task feature describing a characteristic of a task to be assigned to an expert;
   receiving, for each of a plurality of experts, at least one expert feature describing a characteristic of that expert;
   arranging a machine learning system to access a mapping from expert features and task features to a multi-dimensional latent trait space, that mapping having been learnt by the machine learning system; and
   arranging a selection engine to, for each expert, map the task features and expert features to the multi-dimensional trait space using the mapping to produce a latent task trait and a latent expert trait and to combine the latent task trait and latent expert trait using a similarity measure to obtain an estimate of a probability distribution over the expert's performance on the task; and
   arranging the selection engine to select one of the experts on the basis of the estimated probability distributions.

2. A method as claimed in claim 1 which comprises receiving the task features and expert features as binary vectors which are sparsely active.

3. A method as claimed in claim 1 wherein the selection engine is arranged to produce the latent task and expert traits as vectors of floating-point numbers.

4. A method as claimed in claim 1 wherein the machine learning system is arranged to have learnt the mapping using a Baysian update process.

5. A method as claimed in claim 1 which comprises using an assumed density filtering process at the machine learning system.

6. A method as claimed in claim 1 which comprises receiving feedback comprising an observed performance of the selected expert on the task and wherein the method comprises using the machine learning system to update the mapping on the basis of the feedback.

7. A method as claimed in claim 1 which comprises using the machine learning system to form a plurality of probability distributions representing belief about parameters of the mapping and adding to the variance of those probability distributions at specified time intervals.

8. A method as claimed in claim 1 wherein the experts are automated problem solvers and the task is selected from any of: an optimization problem, a combinatorial auction problem, a constraint satisfaction problem.

9. A method as claimed in claim 8 which comprises receiving feedback comprising an observed runtime of the selected automated problem solver and wherein the method comprises using the machine learning system to update the mapping on the basis of the feedback.

10. A method as claimed in claim 1 which further comprises arranging the selection engine to access a utility function and to use that utility function when selecting the selected expert.

11. A method as claimed in claim 1 which comprises arranging the machine learning system such that the multi-dimensional trait space has a maximum of three dimensions and which further comprises displaying a visual representation of the multi-dimensional trait space.

12. A computer-readable memory having stored thereon computer executable instructions to implement a selection engine comprising:
   receiving at least one task feature describing a characteristic of a task to be assigned to an expert, the task feature comprising a sparsely active binary vector; and
   receiving, for each of a plurality of experts, at least one expert feature describing a characteristic of that expert, the expert feature comprising a sparsely active binary vector;
   a machine learning system comprising a mapping from expert features and task features to a multi-dimensional latent trait space, that mapping having been learnt by the machine learning system; and
   instructions to arrange a processor to:
      for each expert, map the task features and expert features to the multi-dimensional trait space using the mapping to produce a latent task trait and a latent expert trait and to combine the latent task trait and latent expert trait using a similarity measure to obtain an estimate of a probability distribution over the expert's performance on the task; and
      select one of the experts on the basis of the estimated probability distributions.

13. A computer-readable memory as claimed in claim 12 wherein the instructions arrange the processor to use an inner product of the latent task trait and latent expert trait as the similarity measure.

14. A computer-readable memory as claimed in claim 12 wherein the instructions comprise a feedback component arranged to receive feedback comprising an observed performance of the selected expert on the task and wherein the instructions are to implement the machine learning system to update the mapping on the basis of the feedback.

15. A computer-readable memory as claimed in claim 14 wherein the instructions are to implement the machine learning system to form a factor graph in memory for the observed performance and to carry out message passing along edges of the factor graph using an approximate sum-product algorithm.

16. A computer-readable memory as claimed in claim 12 wherein the instructions are to implement the machine learning system to form a plurality of probability distributions representing belief about parameters of the mapping and to add to the variance of those probability distributions at specified time intervals.

17. A computer-readable memory as claimed in claim 12 wherein the plurality of experts include automated problem solvers and the task is selected from any of: an optimization problem, a combinatorial auction problem, or a constraint satisfaction problem.

18. An apparatus comprising:
   an input arranged to receive at least one task feature describing a characteristic of a task to be assigned to an automated problem solver, the task feature comprising sparsely active binary vector; and
   the input also arranged to receive, for each of a plurality of automated problem solvers, at least one automated problem solver feature describing a characteristic of that automated problem solver, the automated problem solver feature comprising a sparsely active binary vector; and a machine learning system comprising a mapping from automated problem solver features and task features to a multi-dimensional latent trait space; and a processor arranged to, for each automated problem solver, map the task features and automated problem solver features to the multi-dimensional trait space using the mapping to produce a latent task trait and a latent expert trait and to combine the latent task trait and latent expert trait using a similarity measure to obtain an estimate of a probability distribution over the automated problem solver's performance on the task; and the processor being arranged to select one of the automated problem solvers on the basis of the estimated probability distributions.

19. An apparatus as claimed in claim 18 further comprising a feedback component arranged to receive an observed performance of the selected automated problem solver with respect to the task and wherein the machine learning system is arranged to form a factor graph in memory, instantiate nodes of that factor graph according to the observed performance, and carry out inference by performing message passing over the factor graph.

20. An apparatus as claimed in claim 18 wherein the machine learning system is arranged such that the multi-dimensional trait space has three dimensions.

* * * * *

UNITED STATES PATENT AND TRADEMARK OFFICE
CERTIFICATE OF CORRECTION

PATENT NO.         : 8,433,660 B2                                                Page 1 of 1
APPLICATION NO.    : 12/628421
DATED              : April 30, 2013
INVENTOR(S)        : Stern et al.

It is certified that error appears in the above-identified patent and that said Letters Patent is hereby corrected as shown below:

In the Specification

In column 7, line 31, delete "it" and insert -- its --, therefor.

In the Claims

In column 13, line 41, In Claim 4, delete "Baysian" and insert -- Bayesian --, therefor.

In column 14, line 60, In Claim 18, after "comprising" insert -- a --.

Signed and Sealed this
Tenth Day of February, 2015

Michelle K. Lee
*Deputy Director of the United States Patent and Trademark Office*